(12) United States Patent
Springer et al.

(10) Patent No.: US 7,793,941 B2
(45) Date of Patent: Sep. 14, 2010

(54) RING SEAL WITH INNER LIP

(75) Inventors: James A. Springer, Ann Arbor, MI (US); Patrick M. Gibson, Ann Arbor, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 15 days.

(21) Appl. No.: 11/625,944

(22) Filed: Jan. 23, 2007

(65) Prior Publication Data

US 2008/0174074 A1    Jul. 24, 2008

(51) Int. Cl.
F16J 15/16    (2006.01)
F16J 15/46    (2006.01)
F16J 9/24     (2006.01)

(52) U.S. Cl. .............. 277/579; 277/580; 277/582; 277/589; 277/445; 277/447

(58) Field of Classification Search ......... 277/579–582, 277/589, 543, 445, 447, 448, 493
See application file for complete search history.

(56) References Cited

U.S. PATENT DOCUMENTS

| | | | | |
|---|---|---|---|---|
| 51,250 | A * | 11/1865 | Wheelock | 277/467 |
| 75,927 | A * | 3/1868 | King | 277/445 |
| 639,363 | A * | 12/1899 | Dockum | 277/483 |
| RE18,776 | E * | 3/1933 | McMinn | 92/126 |
| 2,606,085 | A * | 8/1952 | Kiekhaefer | 92/216 |
| 2,620,245 | A * | 12/1952 | Moore et al. | 277/446 |
| 2,768,037 | A * | 10/1956 | Payne | 92/155 |
| 3,390,889 | A * | 7/1968 | Grover | 277/440 |
| 3,427,051 | A * | 2/1969 | White et. al. | 285/145.5 |
| 3,612,538 | A * | 10/1971 | Sievenpiper | 277/468 |
| 3,612,545 | A * | 10/1971 | Storms | 277/582 |
| 3,727,925 | A * | 4/1973 | Jones | 277/468 |
| 3,887,198 | A * | 6/1975 | McClure et al. | 277/579 |
| 3,942,806 | A * | 3/1976 | Edlund | 277/589 |
| 3,967,829 | A * | 7/1976 | Rogers | 277/589 |
| 4,050,702 | A * | 9/1977 | Del Matto | 277/483 |
| 4,190,259 | A * | 2/1980 | Zitting | 277/584 |
| 4,203,607 | A * | 5/1980 | Brieger | 277/584 |

(Continued)

FOREIGN PATENT DOCUMENTS

EP    1536167 A1    6/2005

OTHER PUBLICATIONS

RD 391037, Nov. 1996, anonymous (clipped image).*

*Primary Examiner*—Alison K Pickard

(57) ABSTRACT

A device for sealing between a first component and a second component is disclosed. The first component has a groove and the groove has a first wall and a second wall. The annular body includes a first side configured to selectively contact the first wall of the groove, a second side opposite the first side configured to selectively contact the second wall of the groove, a first surface in contact with the second component, and a second surface opposite the first surface. A lip is bonded to the second surface and extends at least partially around the second surface of the annular body. A pressure acting on the first side of the annular body forces the second side to contact the second wall of the groove, and a pressure acting on the second side of the annular body forces the first side to contact the first wall of the groove.

13 Claims, 2 Drawing Sheets

U.S. PATENT DOCUMENTS

| | | | |
|---|---|---|---|
| 4,448,429 A * | 5/1984 | Thomas | 277/589 |
| 4,497,494 A * | 2/1985 | Allen et al. | 277/580 |
| 5,018,753 A * | 5/1991 | Porel | 277/589 |
| 5,149,107 A * | 9/1992 | Maringer et al. | 277/556 |
| 5,518,256 A | 5/1996 | Gaffal | |
| 5,713,578 A * | 2/1998 | Terao et al. | 277/582 |
| 5,725,221 A * | 3/1998 | Pekarsky et al. | 277/589 |
| 5,826,681 A * | 10/1998 | Kubo et al. | 188/71.8 |
| 5,996,425 A * | 12/1999 | Welker | 73/864.62 |
| 6,036,191 A * | 3/2000 | Millard | 277/553 |
| 6,179,296 B1 * | 1/2001 | Cawthorne et al. | 277/336 |
| 6,796,216 B2 * | 9/2004 | Kuchheuser | 92/168 |
| 7,195,469 B2 * | 3/2007 | Tsuchiya et al. | 418/55.4 |
| 2007/0085280 A1 * | 4/2007 | Romero et al. | 277/589 |
| 2008/0277882 A1 * | 11/2008 | Kyohei et al. | 277/579 |
| 2009/0051124 A1 * | 2/2009 | Kakehi | 277/581 |

\* cited by examiner

RING SEAL WITH INNER LIP

FIELD

The present disclosure relates to ring seals, and more particularly to a ring seal with an inner lip.

BACKGROUND

The statements in this section merely provide background information related to the present disclosure and may not constitute prior art.

There are many applications where a seal is required between a rotating component and a stationary component, such as in a transmission or an engine. Typically, a ring seal is used to seal the rotating component to the stationary component in order to keep fluids on either side of the ring seal from escaping to the other side. The ring seal typically includes a circular member that fits around the stationary component and an outer surface that engages the surface of the rotating component. One complication of the above described ring seal is that the ring seal must remain stationary relative to the rotating component while still maintaining an effective seal to the rotating component. In this regard, the typical ring seal must keep friction forces between the ring seal and the rotating component to a minimum while still maintaining enough radial force to keep fluid from moving past the ring seal.

One solution known in the art to keeping these radial friction forces to a minimum is to force the ring seal to move in an axial direction against a tab or groove formed on the stationary component. By using axial forces, radial forces can be kept to a minimum. Axial forces typically originate from a pressure differential of the fluid on each side of the ring seal. As the pressure differential changes from one side of the ring seal to the other, the ring seal is able to move from one position sealed against the stationary component to a second position sealed against the stationary component.

However, during the transition between positions, there can be leakage of the fluid around the seal. One solution known in the art is to provide a second ring between the ring seal and one of the components. While effective for its intended purpose, the second ring can increase the radial forces of the ring seal, thereby increasing friction between the ring seal and the rotating element. Moreover, the second ring increases assembly costs. Therefore, there is room in the art for a ring seal that minimizes fluid leakage across the seal during transition while simultaneously providing a construction that does not increase assembly costs.

SUMMARY

In an aspect of the present invention a device for sealing between a first component and a second component is provided, the first component having a groove formed therein, the groove having a first wall and a second wall.

In one aspect of the present invention, the device includes an annular body having a first side configured to selectively contact the first wall of the groove, a second side opposite the first side, wherein the second side is configured to selectively contact the second wall of the groove, a first surface in contact with the second component, and a second surface opposite the first surface. A lip is bonded to the second surface and extends at least partially around the second surface of the annular body. A pressure acting on the first side of the annular body forces the second side to contact the second wall of the groove, and a pressure acting on the second side of the annular body forces the first side to contact the first wall of the groove.

In another aspect of the present invention, the first surface is an outer surface of the annular body.

In yet another aspect of the present invention, the second surface is an inner surface of the annular body.

In still another aspect of the present invention, the annular body is plastic.

In still another aspect of the present invention, the lip is rubber.

In yet another aspect of the present invention, the lip includes a plurality of segments extending along the inner surface of the annular body.

In still another aspect of the present invention, the plurality of segments include a first segment, a second segment, and a third segment.

In still another aspect of the present invention, the annular body includes a plurality of tabs for engaging the second component to prevent rotation of the device, one of the tabs disposed between the first segment and the third segment and one of the tabs disposed between the second segment and the third segment.

In yet another aspect of the present invention, the annular body includes a step joint between the first segment and the second segment.

In still another aspect of the present invention, the lip does not contact the groove.

In still another aspect of the present invention, the lip has a width less than a width of the annular body.

In a second embodiment of the present invention, the device includes an annular body having a first side configured to selectively contact the first wall of the groove, a second side opposite the first side, wherein the second side is configured to selectively contact the second wall of the groove, an outer surface in contact with the second component, and an inner surface. A lip is adjacent to the inner surface and extends at least partially around the inner surface of the annular body. A pressure acting on the first side of the annular body and the lip forces the second side to contact the second wall of the groove, and a pressure acting on the second side of the annular body forces the first side to contact the first wall of the groove.

In one aspect of the second embodiment, the lip is bonded to the inner surface of the annular body.

In another aspect of the second embodiment, the annular body is plastic.

In yet another aspect of the second embodiment, the lip is rubber.

In still another aspect of the second embodiment, the lip includes a plurality of segments extending along the inner surface of the annular body.

In still another aspect of the second embodiment, the plurality of segments include a first segment, a second segment, and a third segment.

In yet another aspect of the second embodiment, the annular body includes a plurality of tabs for engaging the second component to prevent rotation of the device, one of the tabs disposed between the first segment and the third segment and one of the tabs disposed between the second segment and the third segment.

In still another aspect of the second embodiment, the annular body includes a step joint between the first segment and the second segment.

In still another aspect of the second embodiment, the first segment and the second segment are equal in length.

In yet another aspect of the second embodiment, the third segment has a greater length than the first segment and the second segment.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
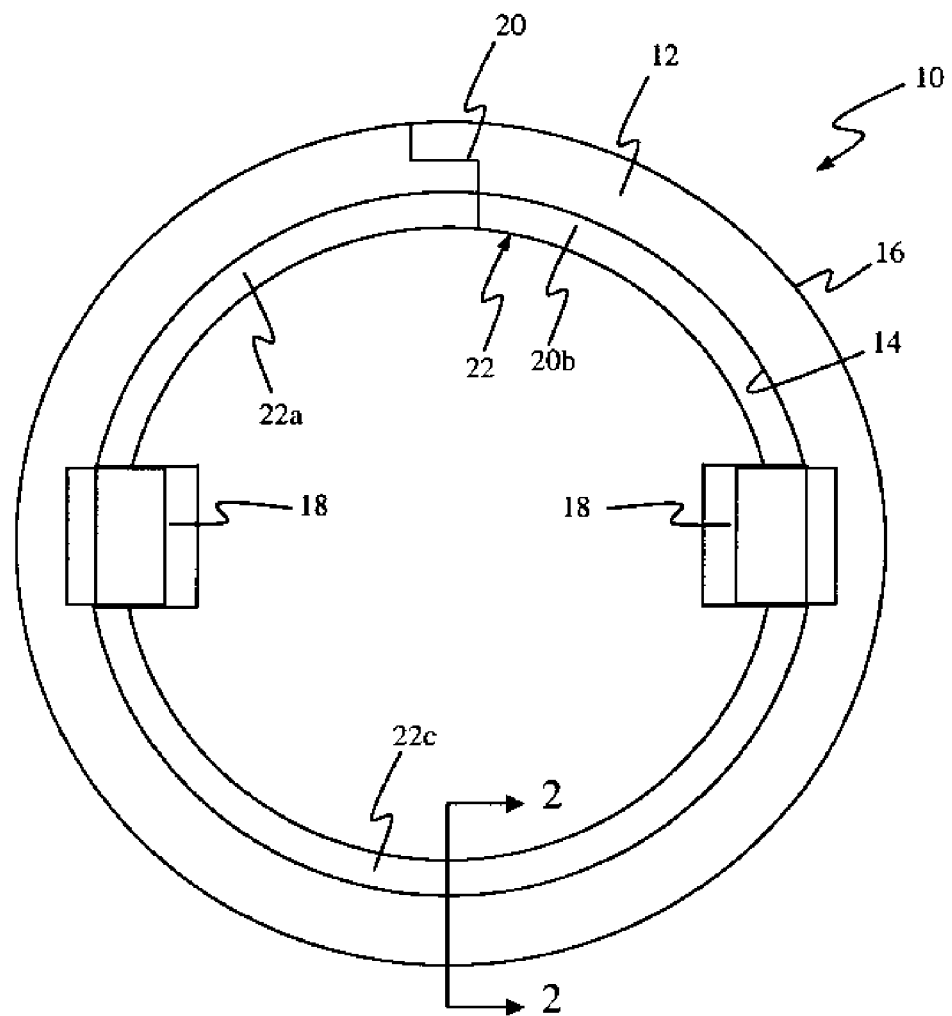
FIG. 1 is a front view of a ring seal according to the principles of the present invention.

FIG. 1 illustrates a ring seal 10 designed according to the principles of the present invention. The ring seal 10 includes an annular body 12. The annular body 12 is generally circular in shape and includes an inner surface 14 and an outer surface 16. A plurality of tab members 18 extend from the annular body radially inward. In the particular example provided, there are two tab members 18 spaced diametrically opposite one another on the annular body 12, but it should be appreciated that any number of tab members 18 may be employed at any location along the annular body 12. The tab members 18 are sized to engage slots (not shown) on a component 34 (FIG.'S 2 and 3) in order to prevent the ring seal 10 from rotating. The annular body 12 further includes a step joint 20 formed therein. The step joint 20 allows the annular body 12 to expand to maintain its sealing characteristics.

The ring seal 10 further includes a lip 22 adjacent to the inner surface 14 of the annular body 12. In the preferred embodiment of the present invention, the lip 22 is bonded to the annular body 12, though various other methods of coupling the lip 22 to the annular body 12 may be employed. For example, the lip 22 may be formed directly from the annular body 12 as a unitary piece. The lip 22 extends along the inner circumference of the annular body 12 and is generally circular in shape. The lip 22 includes three segments including a first segment 22a, a second segment 22b, and a third segment 22c. The first segment 22a is disposed between one of the tab members 18 and the step joint 20. The second segment 22b is disposed between another of the tab members 18 and the step joint 20. The third segment 22c is disposed between the two tab members 18. In this regard, the first segment 22a and the second segment 22b span arcs approximately equal to 90 degrees while the third segment 22c spans an arc approximately equal to 180 degrees. However, it should be appreciated that the lip 22 may extend around the inner circumference of the annular body 12 without interruption or in various other configurations without departing from the scope of the present invention.

Figure 2:
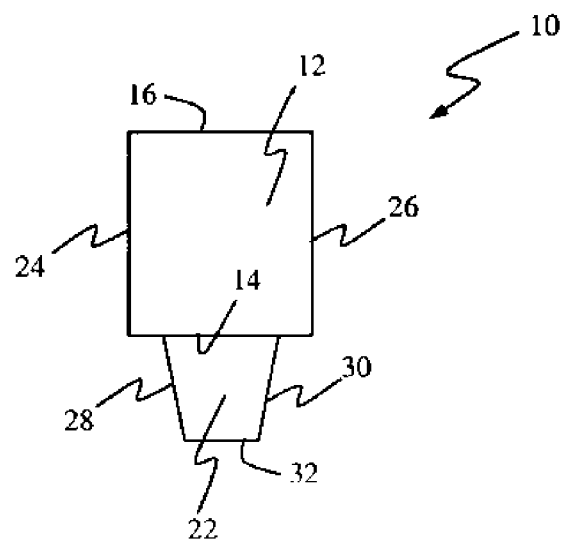
FIG. 2 is an enlarged cross-sectional view of the ring seal of FIG. 1 according to the principles of the present invention.

With reference to FIG. 2, an enlarged cross-sectional view of the ring seal 10 in the direction of arrow 2-2 in FIG. 1 is shown. The annular body 12 of the ring seal 10 further includes a first side 24 and a second side 26. The first side 24 is opposite the second side 26. The lip 22 is bonded to the inner surface 14, as noted above, and has a width less than a width of the annular body 12. The lip 22 is preferably spaced equidistant between the first side 24 and the second side 26, however the lip 22 may be disposed asymmetrically with respect to the first side 24 and the second side 26.

The lip 22 includes a first face 28, a second face 30 opposite the first face 28, and a bottom 32 that extends between the first face 28 and the second face 30. In the preferred embodiment, the first face 28 and the second face 30 slope towards one another, but it should be appreciated that the first face 28 and second face 30 may be parallel to one another or form a trapezoidal or other asymmetrical shape.

The annular body 12 is made from a hard plastic, such as, for example, a glass-filled plastic. The lip 22 is made from a flexible rubber and, as noted above, is preferably bonded to the annular body 12. It should be appreciated that other materials may be used to construct the annular body 12 and the lip 22 so long as the basic properties of the preferred embodiment are preserved.

Figure 3A:
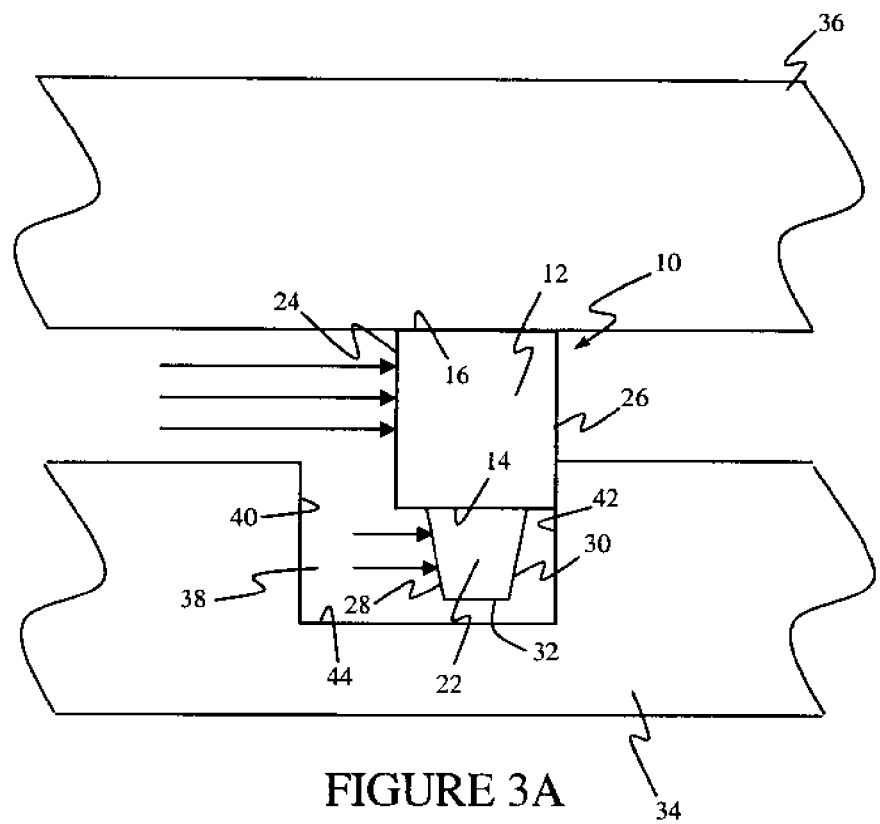
FIG. 3A is a cross-sectional view of the ring seal of the present invention in a first position between two components.

Turning now to FIG. 3A, the ring seal 10 is illustrated in use with a first component 34 and a second component 36. The first component includes a groove 38 formed therein. The groove includes a first wall 40, a second wall 42 opposite the first wall 40, and a base 44 extending between the first wall 40 and the second wall 42. The groove 38 has a width greater than a width of the ring seal 10.

The first component 34 and the second component 36 are positioned proximate to each other. In the particular example provided, the first component 34 is stationary and the second component 36 is rotatable with respect to the first component 34. However, it should be appreciated that either component 34, 36 may be stationary and either component 34, 36 may be moveable, whether through rotation or translation relative to one another.

The ring seal 10 is disposed between the first component 34 and the second component 36 such that the annular body 12 extends at least partially within the groove 38. The lip 22 is disposed within the groove 38 but does not contact the first wall 40, the second wall 42, nor does it necessarily contact the base 44 of the groove 38. The outer surface 16 of the annular body 12 is in contact with the second component 36. This contact between the outer surface 16 and the second component 36 acts as a seal and limits fluid from passing between the outer surface 16 and the second component 36. The outer surface 16 is preferably smooth to allow rotation of the second component 36 with respect to the ring seal 10.

Figure 3B:
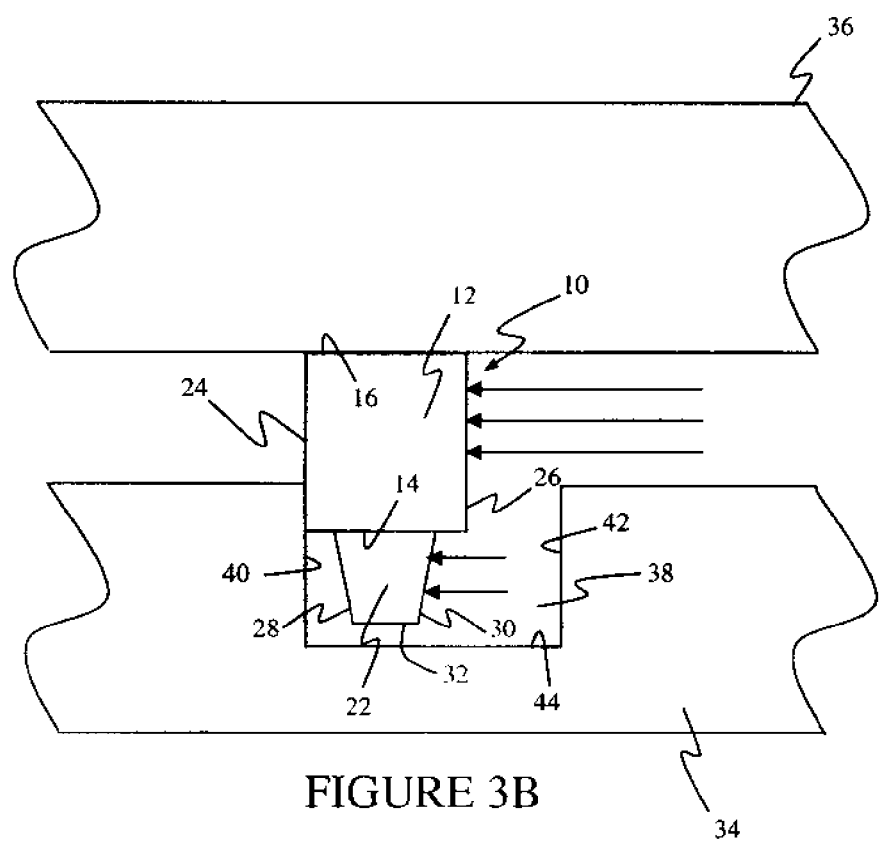
FIG. 3B is a cross-sectional environmental view of the ring seal of the present invention in a second position between the two components.

The ring seal 10 is moveable between a first position, illustrated in FIG. 3A, and a second position, illustrated in FIG. 3B. Specifically, pressurized fluid (not specifically shown) on either side of the ring seal 10 acts on the ring seal 10. When there is a sufficiently large pressure differential between the fluid on either side of the ring seal 10, the ring seal 10 transitions within the groove 38 and contacts one of the walls 40, 42 to limit fluid from passing between the ring seal 10 and the first component 34.

In the first position shown in FIG. 3A, fluid pressure (indicated by the arrows) acts on the first side 24 of the annular body 12 and acts on the first face 28 of the lip 22. Fluid pressure provides a force which moves the ring seal 10 within the groove 38 such that the second side 26 of the ring seal 10 contacts the second wall 42 of the groove 38. This contact acts as a seal and limits fluid from passing between the second side 26 of the ring seal 10 and the second wall 42 of the groove 38. By concentrating the sealing forces in a lateral direction rather than a radial direction, the friction between the outer surface 16 of the ring seal 10 and the second component 36 is not significantly increased.

In the second position shown in FIG. 3B, fluid pressure (indicated by the arrows) acts on the second side 26 of the annular body 12 and acts on the second face 30 of the lip 22. Fluid pressure provides a force which moves the ring seal 10 within the groove 38 such that the first side 24 of the ring seal 10 contacts the first wall 40 of the groove 38. This contact acts as a seal and limits fluid from passing between the first side 24 of the ring seal 10 and the first wall 40 of the groove 38. By keeping the sealing forces in a lateral direction rather than a radial direction, the friction between the outer surface 16 of the ring seal 10 and the second component 36 is again not significantly increased.

As noted above, a change in the pressure differential acting on the ring seal 10 will cause the ring seal 10 to move between the first position (shown in FIG. 3A) and the second position (shown in FIG. 3B) During this transition, fluid can leak between the ring seal 10 and the first component 34. The lip 22 in this regard acts like a dam to reduce the amount of leakage during the transition between the first position and the second position by reducing the volume between the annular body 12 and the groove 38. Moreover, by limiting the amount of leakage of the fluid during transition, the lip 22 helps maintain a higher pressure differential on either side of the ring seal 10. This higher pressure differential means the force acting on the ring seat 10 is greater, which in turn means the ring seal 10 makes the transition between the first position and the second position rapidly, thus further reducing the leakage. In addition, the flexibility of the lip 22 prevents large increases in frictional forces if the lip 22 contacts the first component 34 as the lip 22 will flex or compress, thereby absorbing much of the radial force.

The description of the invention is merely exemplary in nature and variations that do not depart from the gist of the invention are intended to be within the scope of the invention. Such variations are not to be regarded as a departure from the spirit and scope of the invention.

What is claimed is:

1. A device for sealing between a first component and a second component, the first component having a groove and an anti-rotation slot formed therein, the groove having a first wall and a second wall, the device comprising:
   an annular body at least partially disposed within the groove, the annular body having:
      a first side configured to selectively contact the first wall of the groove;
      a second side opposite the first side, wherein the second side is configured to selectively contact the second wall of the groove;
      a first surface in contact with the second component;
      a second surface opposite the first surface; and
      an anti-rotation tab disposed on the annular body and sized to engage the anti-rotation slot on the first component;
   a lip having an outer surface bonded to the second surface, the lip having a plurality of segments extending at least partially around the second surface of the annular body and wherein the lip does not contact the first component; and
   whereby a pressure acting on the first side of the annular body and the lip forces the second side to contact the second wall of the groove, and a pressure acting on the second side of the annular body and the lip forces the first side to contact the first wall of the groove.

2. The device of claim 1 wherein the first surface is an outer surface of the annular body.

3. The device of claim 2 wherein the second surface is an inner surface of the annular body.

4. The device of claim 3 wherein the annular body is plastic.

5. The device of claim 4 wherein the lip is rubber.

6. The device of claim 5 wherein the plurality of segments include a first segment, a second segment, and a third segment.

7. The device of claim 6 wherein the annular body includes a plurality of anti-rotation tabs for engaging the first component to prevent rotation of the device, one of the anti-rotation tabs disposed between the first segment and the third segment and one of the anti-rotation tabs disposed between the second segment and the third segment.

8. The device of claim 7 wherein the annular body includes a step joint between the first segment and the second segment.

9. The device of claim 1 wherein the lip has a width less than a width of the annular body.

10. A device for sealing between a first component and a second component, the first component having a groove formed therein, the groove having a first wall and a second wall, the device comprising:
    a plastic annular body at least partially disposed within the groove, the annular body having:
       a first side configured to selectively contact the first wall of the groove;
       a second side opposite the first side, wherein the second side is configured to selectively contact the second wall of the groove;
       a first surface in contact with the second component;
       a second surface opposite the first surface; and
    a lip having an outer surface bonded to the second surface, the lip having a plurality of segments extending along the second surface of the annular body and extending at least partially around the second surface of the annular body, the lip having a width less than a width of the annular body and wherein the lip does not contact the first component,
    wherein the lip is rubber,
    wherein the plurality of segments include a first segment, a second segment, and a third segment,
    wherein the annular body includes a plurality of anti-rotation tabs for engaging the first component to prevent rotation of the device, one of the anti-rotation tabs disposed between the first segment and the third segment and one of the anti-rotation tabs disposed between the second segment and the third segment, and
    whereby a pressure acting on the first side of the annular body and the lip forces the second side to contact the second wall of the groove, and a pressure acting on the second side of the annular body and the lip forces the first side to contact the first wall of the groove.

11. The device of claim 10 wherein the annular body includes a step joint between the first segment and the second segment.

12. The device of claim 10 wherein the first segment and the second segment are equal in length.

13. The device of claim 12 wherein the third segment has a greater length than the first segment and the second segment.

* * * * *